(12) United States Patent
Chatani et al.

(10) Patent No.: US 12,169,886 B2
(45) Date of Patent: Dec. 17, 2024

(54) DISPLAY DEVICE, DISPLAY METHOD, AND STORAGE MEDIUM

(71) Applicant: ULVAC, Inc., Kanagawa (JP)

(72) Inventors: Hironori Chatani, Kanagawa (JP); Yuta Hayashi, Kanagawa (JP); Toshiya Soyama, Kanagawa (JP); Daisuke Kawakubo, Kanagawa (JP)

(73) Assignee: ULVAC, Inc., Kanagawa (JP)

( * ) Notice: Subject to any disclaimer, the term of this patent is extended or adjusted under 35 U.S.C. 154(b) by 0 days.

(21) Appl. No.: 18/288,152

(22) PCT Filed: Feb. 17, 2023

(86) PCT No.: PCT/JP2023/005762
§ 371 (c)(1),
(2) Date: Oct. 24, 2023

(87) PCT Pub. No.: WO2023/162886
PCT Pub. Date: Aug. 31, 2023

(65) Prior Publication Data
US 2024/0202998 A1    Jun. 20, 2024

(30) Foreign Application Priority Data
Feb. 25, 2022  (JP) .................................. 2022-027937

(51) Int. Cl.
*G06T 11/20* (2006.01)
(52) U.S. Cl.
CPC ........ *G06T 11/206* (2013.01); *G06T 2200/24* (2013.01)
(58) Field of Classification Search
CPC .......................... G06T 11/206; G06T 2200/24
See application file for complete search history.

(56) References Cited

U.S. PATENT DOCUMENTS 9,996,952 B1    6/2018  Parker
10,062,190 B1   8/2018  Parker
(Continued)

FOREIGN PATENT DOCUMENTS

CN    104035785 A    9/2014
CN    104204976 A    12/2014
(Continued)

OTHER PUBLICATIONS

Office Action from related Taiwanese Appln. No. 112105706, dated Feb. 7, 2024 English translation attached. 7 pages.
(Continued)

*Primary Examiner* — Kee M Tung
*Assistant Examiner* — Jed-Justin Imperial
(74) *Attorney, Agent, or Firm* — Grossman, Tucker, Perreault & Pfleger, PLLC

(57) ABSTRACT

A display device of the present invention includes a display controller executing display control processing of controlling an operation of a predetermined display destination to cause the display destination to display a plurality of N-dimensional graphs. The plurality of N-dimensional graphs include a first graph and a second graph. When a predetermined condition related to acquisition of fixed value change information including auxiliary explanatory variable information designating one or more of auxiliary explanatory variables as objects to be changed in value, and information indicating current variable values is satisfied, the display control processing includes processing of updating the first graph and the second graph to be displayed on the display destination to a changed graph due to changing of values of the auxiliary explanatory variables indicated by the auxiliary explanatory variable information to the current variable values indicated by the fixed value change information.

15 Claims, 6 Drawing Sheets

(56) References Cited

U.S. PATENT DOCUMENTS

| | | | |
|---|---|---|---|
| 10,991,136 B1* | 4/2021 | Helfman | G06T 11/203 |
| 2010/0235771 A1* | 9/2010 | Gregg, III | G06T 11/206 |
| | | | 715/769 |
| 2013/0201191 A1 | 8/2013 | Moringana et al. | |
| 2016/0180555 A1 | 6/2016 | Matsuo | |
| 2018/0018797 A1 | 1/2018 | Motohashi et al. | |
| 2020/0348906 A1 | 11/2020 | Barnes, Jr. | |
| 2022/0047212 A1* | 2/2022 | Balsamo | G06F 3/0488 |

FOREIGN PATENT DOCUMENTS

| | | |
|---|---|---|
| CN | 104205826 A | 12/2014 |
| CN | 105051780 A | 11/2015 |
| CN | 105748057 A | 7/2016 |
| CN | 108471966 A | 8/2018 |
| CN | 108632587 A | 10/2018 |
| CN | 109564199 A | 4/2019 |
| CN | 109756647 A | 5/2019 |
| JP | 2000-333665 | 12/2000 |
| JP | 2022002029 A | 1/2022 |
| TW | 200540676 A | 12/2005 |
| WO | 2013114510 | 8/2013 |

OTHER PUBLICATIONS

Office Action from related Korean Appln. No. 10-2023-7034741, dated Feb. 22, 2024. English translation attached. 3 pages.
Office Action from related Chinese Appln. No. 2023800112837, dated Mar. 15, 2024. Partial English translation attached.
International Search Report and Written Opinion from PCT/JP2023/005762 mailed May 16, 2023, with English Translation.
Notice of Allowance from Chinese Application No. 202380011283.7, dated May 11, 2024. English translation attached. 8 pages.

* cited by examiner

DISPLAY DEVICE, DISPLAY METHOD, AND STORAGE MEDIUM

TECHNICAL FIELD

Cross Reference to Related Applications

This application is a U.S. National Stage Application of PCT/JP2023/005762, filed Feb. 17, 2023, which claims priority to Japanese Patent Application No. 2022-027937 filed on Feb. 25, 2022, the contents both of which are incorporated herein by reference.

BACKGROUND ART

A display of multidimensional data greatly affects information that a user obtains from displayed information. Therefore, how to display multidimensional data is important. Further, multiple dimensions mean a plurality of dimensions such as two dimensions and three dimensions. So far, as a method of displaying multidimensional data, a method of showing correlations between feature quantities using scatter diagrams or parallel coordinate plots has been proposed.

CITATION LIST

Patent Literature

[Patent Literature 1] PCT International Publication No. WO 2013/114510

SUMMARY OF INVENTION

Technical Problem

However, in the method of displaying multidimensional data using scatter diagrams or parallel coordinate plots, there has been a problem that it is difficult to grasp multidimensional data intuitively. That is, it has been required for a user to exert effort to obtain information from displayed information in some cases. Also, in order to display a desired graph by changing experimental parameters to arbitrary values, it has been necessary to change a program each time. Then, also when a program is to be changed, there has been also a problem that it is difficult to make the change without specialized knowledge about the program. As described above, with methods of displaying multidimensional data so far, there have been cases in which a large amount of effort is required to obtain information.

The present invention has been made in view of the above circumstances, and an objective thereof is to provide a technology for reducing effort required to obtain information from multidimensional data.

Solution to Problem

One aspect of the present invention is a display device including a display controller executing display control processing of controlling an operation of a predetermined display destination to cause the display destination to display a plurality of N-dimensional graphs, which are graphs of N dimensions (N is 2 or 3), in which, when a plurality of types of predetermined explanatory variables are respectively defined as display candidate explanatory variables and a plurality of types of predetermined objective variables are respectively defined as display candidate objective variables, the N-dimensional graphs are each a graph showing a relationship between the explanatory variables of Q-1 types among the display candidate explanatory variables and the objective variable of one type among the display candidate objective variables, the plurality of N-dimensional graphs include a first graph and a second graph in which the explanatory variables are common and the objective variables are different from each other, when a predetermined condition related to acquisition of fixed value change information including auxiliary explanatory variable information designating one or more of auxiliary explanatory variables, which are the display candidate explanatory variables other than the common explanatory variables, as objects to be changed in value, and information indicating current variable values, which are values after the auxiliary explanatory variables are changed, is satisfied, the display control processing includes processing of updating the first graph and the second graph to be displayed on the display destination to a changed graph due to changing of values of the auxiliary explanatory variables indicated by the auxiliary explanatory variable information to the current variable values indicated by the fixed value change information, and the first graph or the second graph is a graph showing a representative value and a dispersion of the objective variable for each value of the common explanatory variables.

One aspect of the present invention is a display method which is a display method executed by a display device including a display controller executing display control processing of controlling an operation of a predetermined display destination to cause the display destination to display a plurality of N-dimensional graphs, which are graphs of N dimensions (N is 2 or 3), in which, when a plurality of types of predetermined explanatory variables are respectively defined as display candidate explanatory variables and a plurality of types of predetermined objective variables are respectively defined as display candidate objective variables, the N-dimensional graphs are each a graph showing a relationship between the explanatory variables of Q-1 types among the display candidate explanatory variables and the objective variable of one type among the display candidate objective variables, the plurality of N-dimensional graphs include a first graph and a second graph in which the explanatory variables are common and the objective variables are different from each other, when a predetermined condition related to acquisition of fixed value change information including auxiliary explanatory variable information designating one or more of auxiliary explanatory variables, which are the display candidate explanatory variables other than the common explanatory variables, as objects to be changed in value, and information indicating current variable values, which are values after the auxiliary explanatory variables are changed, is satisfied, the display control processing includes processing of updating the first graph and the second graph to be displayed on the display destination to a changed graph due to changing of values of the auxiliary explanatory variables indicated by the auxiliary explanatory variable information to the current variable values indicated by the fixed value change information, and the first graph or the second graph is a graph showing a representative value and a dispersion of the objective variable for each value of the common explanatory variables, and the display method includes a display control step of controlling an operation of the predetermined display destination to cause the display destination to display the plurality of N-dimensional graphs, which are graphs of N dimensions (N is 2 or 3), wherein, when a predetermined condition related to acquisition of fixed value change information including auxiliary explanatory variable information designating one or more of auxiliary explanatory variables, which are the display candidate explanatory variables other than the common explanatory variables, as objects to be changed in value, and information indicating current variable values, which are values after the auxiliary explanatory variables are changed, is satisfied, the display control step includes processing of updating the first graph and the second graph to be displayed on the display destination to a changed graph due to changing of values of the auxiliary explanatory variables indicated by the auxiliary explanatory variable information to the current variable values indicated by the fixed value change information.

One aspect of the present invention is a computer-readable non-transitory storage medium storing a program causing a computer to function as the display device described above.

Advantageous Effects of Invention

The present invention makes it possible to reduce effort required to obtain information from multidimensional data.

DESCRIPTION OF EMBODIMENTS

Embodiment

Figure 1:
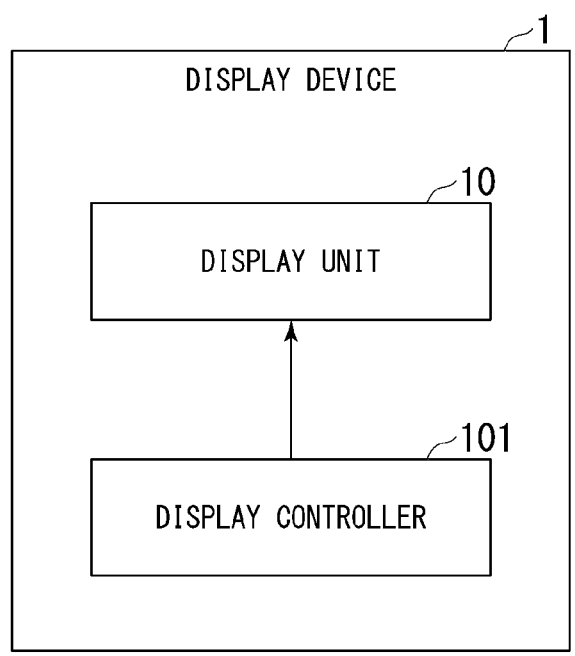
FIG. 1 is an explanatory diagram for explaining an outline of a display device according to an embodiment.

FIG. 1 is an explanatory diagram for explaining an outline of a display device 1 according to an embodiment. The display device 1 includes a display unit 10 that performs a display. The display device 1 displays multidimensional data, which is data of multiple dimensions, by the display unit 10. Further, multidimensional refers to a plurality of dimensions such as two dimensions and three dimensions. Also, the display device 1 also includes a display controller 101 that controls an operation of the display unit 10. Therefore, the display device 1 displays multidimensional data on the display unit 10 by controlling an operation of the display unit 10 by the display controller 101. Further, the display device 1 may not necessarily include the display unit 10. The display unit 10 may be mounted in a housing different from that of the display device 1. For simplicity of explanation, the display device 1 will be described by taking a case in which the display device 1 includes the display unit 10 as an example.

Figure 2:
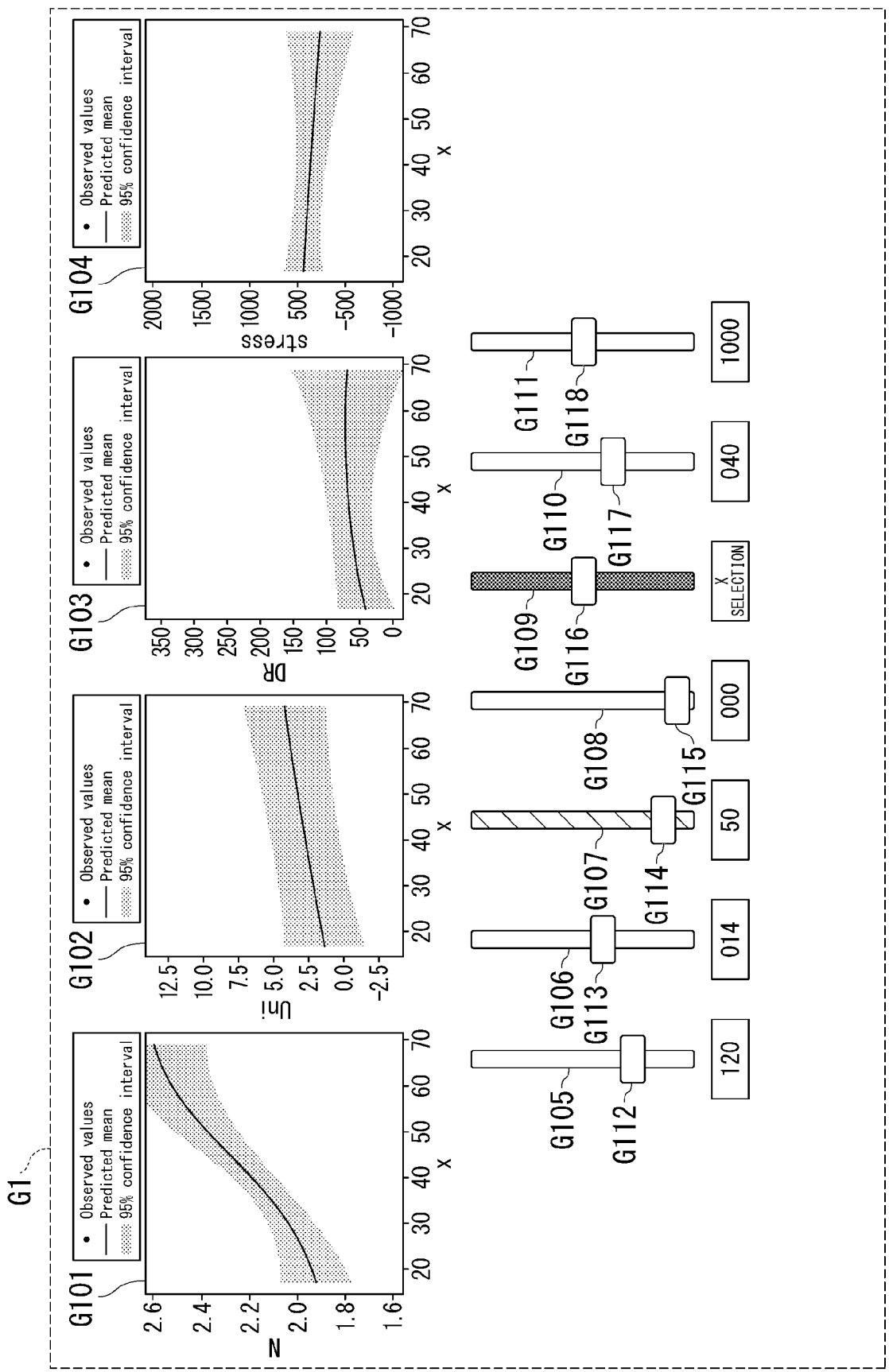
FIG. 2 is a first diagram showing an example of a display displayed by a display unit in the embodiment.

FIG. 2 is a first diagram showing an example of a display displayed by the display unit 10 in the embodiment. An operation of the display unit 10 is controlled by the display controller 101. Therefore, a display G1 shown in FIG. 2 is an example of the display displayed on the display unit 10 by the display controller 101. Four graphs G101 to G104 are displayed on the display G1. In each of the four graphs G101 to G104, the horizontal axis represents a value of an explanatory variable, and the vertical axis represents a value of an objective variable. Types of explanatory variables represented by the horizontal axes of the four graphs G101 to G104 are the same. Each of the four graphs G101 to G104 is a graph showing a representative value and a dispersion of the objective variable for each value on the horizontal axis. The representative value is, for example, an average. The dispersion is, for example, a standard deviation.

The display G1 further displays seven images G105 to G111 of sliders. The images of the sliders each indicate a candidate of the explanatory variable that can be displayed on the horizontal axis of each of the graphs G101 to G104. Each explanatory variable indicated by the image of the slider is the explanatory variable for the objective variable displayed on the vertical axis of the graph, for example, even if it is not displayed on the horizontal axis of the graph. Therefore, when a value of the explanatory variable that is not displayed on the horizontal axis of the graph changes, the graph also changes.

On the display G1, seven images G112 to G118 of handles are shown to be superimposed on the images G105 to G111 of the sliders. The images of the handles each indicate a value of the explanatory variable expressed by the image of the slider being superimposed depending on a position on the image of the slider being superimposed.

For example, a case in which the image of handle is positioned on an upper portion of the image of the slider and a case in which the image of the handle is positioned on a lower portion are compared. In this case, the image of the handle positioning on an upper portion indicates that a value of the explanatory variable is larger than that in a case in which the image of the handle is positioned on a lower portion. Further, five images of the seven images of the sliders on the display G1 are displayed to be expressed in the same way. Two images thereof are displayed to be expressed in different ways. Specifically, the image G105, the image G106, the image G108, the image G110, and the image G111 of the sliders are displayed to be expressed in the same way. The image G107 and the image G109 are displayed to be expressed in different ways from the image G105, the image G106, the image G108, the image G110, and the image G111. Further, the image G107 and the image G109 are also displayed to be expressed in different ways from each other. Further, the expressions being the same means that, for example, they are expressed in the same color.

In the example shown in FIG. 2, the image G109 is an image of the slider indicating the explanatory variable displayed on the horizontal axes of the graphs G101 to G104. In the example shown in FIG. 2, the image G107 is an image of the slider indicating an explanatory variable whose value is to be changed by a user. The remaining five images of the seven images of the sliders indicate fixed values used to obtain the graphs G101 to G104.

That is, a case of using a function F of seven variables (x1, x2, x3, x4, x5, x6, and x7) will be described. Here, the graph shown in FIG. 2 is a graph showing dependence of the function F on one explanatory variable with the remaining six values among x1 to x7 fixed. Of the six explanatory variables with fixed values, an explanatory variable selected by the user to change a value thereof is the explanatory variable indicated by the image of the slider of the image G107.

Figure 3:
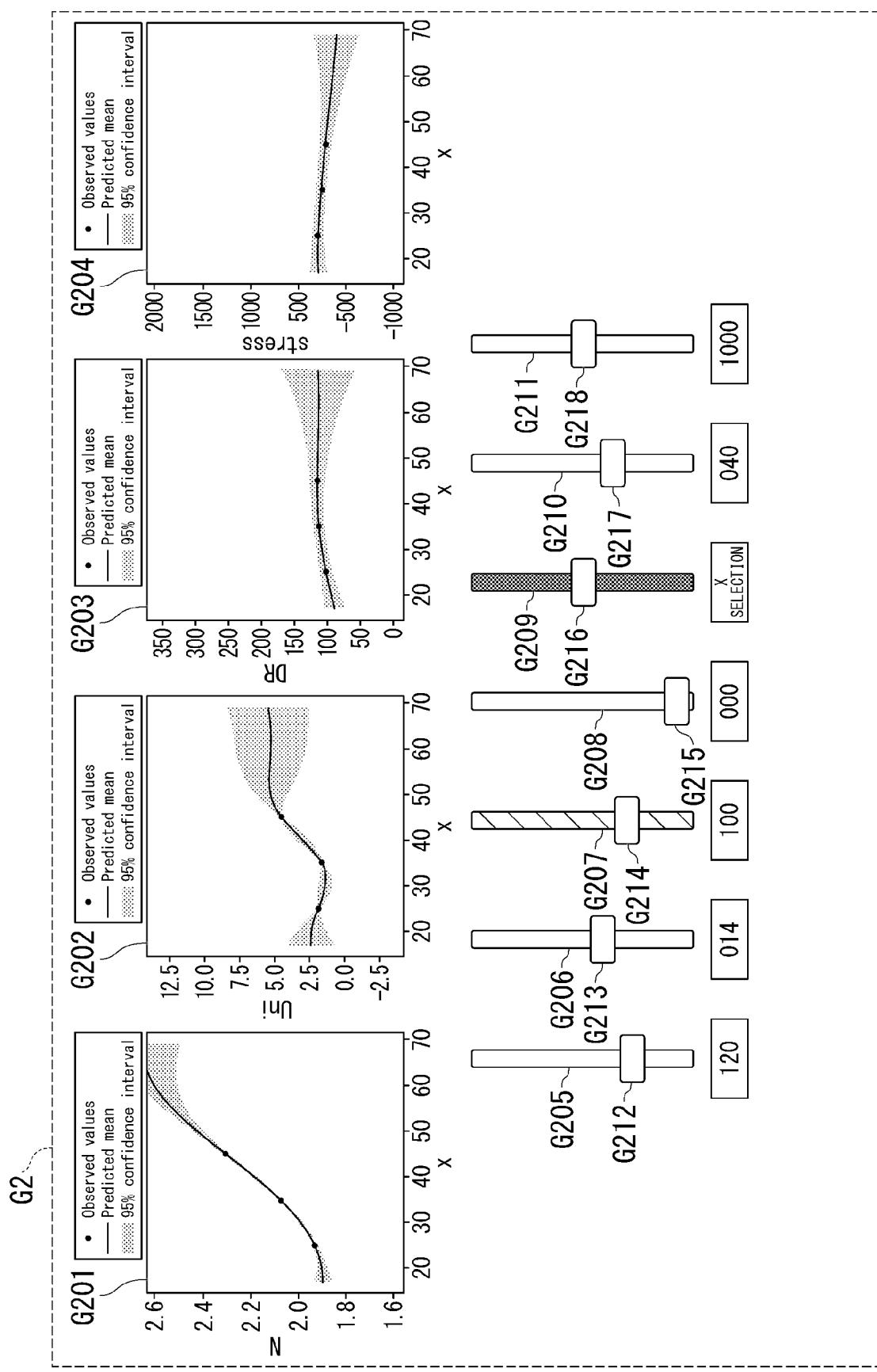
FIG. 3 is a second diagram showing an example of a display displayed by the display unit in the embodiment.

FIG. 3 is a second diagram showing an example of a display displayed by the display unit 10 in the embodiment. An operation of the display unit 10 is controlled by the display controller 101. Therefore, a display G2 shown in FIG. 3 is an example of the display displayed on the display unit 10 by the display controller 101.

Four graphs G201 to G204 are displayed on the display G2. In each of the four graphs G201 to G204, the horizontal axis represents a value of the explanatory variable, and the vertical axis represents a value of the objective variable. Types of explanatory variables represented by the horizontal axes of G201 to G204 of the four graphs are the same. Each of the four graphs G201 to G204 is a graph showing a representative value and a dispersion of the objective variables for each value on the horizontal axis.

Seven images G205 to G211 of sliders are further displayed on the display G2. The images of the sliders each indicate a candidate of the explanatory variable that can be displayed on the horizontal axis of each of the graphs G201 to G204.

On the display G2, seven images G212 to G218 of handles are shown to be superimposed on the images G205 to G211 of the sliders.

Further, five images among the seven images of the sliders on the display G2 are displayed to be expressed in the same way. Two images thereof are displayed to be expressed in different ways. Specifically, the image G205, the image G206, the image G208, the image G210, and the image G211 of the sliders are displayed to be expressed in the same way. The image G207 and the image G209 are displayed to be expressed in different ways from the image G205, the image G206, the image G208, the image G210, and the image G211. Further, the image G207 and the image G209 are also displayed to be expressed in different ways from each other.

In the example shown in FIG. 3, the image G209 is an image of the slider indicating the explanatory variable displayed on the horizontal axes of the graphs G201 to G204. In the example shown in FIG. 3, the image G207 is an image of the slider indicating the explanatory variable whose value is to be changed by the user. The remaining five images of the seven images of the sliders indicate fixed values used to obtain the graphs G201 to G204.

The display G2 shown in FIG. 3 is an updated display after the display G1 is updated as a result of a change in value of the explanatory variable of the image G107 of the slider in the image shown in FIG. 2.

In this way, the display controller 101 controls an operation of a predetermined display destination such as the display unit 10 to display one or more graphs showing a relationship between the explanatory variable and the objective variable on the predetermined display destination. The explanatory variable of each graph displayed on the predetermined display destination is a variable included in a plurality of types of predetermined explanatory variables. Hereinafter, each of the plurality of types of predetermined explanatory variables is defined as a display candidate explanatory variable. Also, the objective variable of each graph displayed on the predetermined display destination is a variable included in a plurality of types of predetermined objective variables. Hereinafter, each of the plurality of types of predetermined objective variables is defined as a display candidate objective variable.

Some Specific Examples

Although the graphs displayed in FIGS. 2 and 3 are specific examples of graphs displayed on the predetermined display destination, here, again, using the terms "display candidate explanatory variable" and "display candidate objective variable," a specific example of the display on the display unit 10 will be described using a case in which there are two graphs for simplicity of explanation.

For example, a case in which a graph displaying the predetermined display destination is a two-dimensional graph may be conceived. In such a case, the explanatory variable of each graph displayed by the predetermined display destination is an explanatory variable X1 which is one of the display candidate explanatory variables. Then, the objective variable in one of a plurality of graphs displayed by the predetermined display destination is an objective variable Y1 which is one of the display candidate objective variables, and the objective variable in one of other graphs is an objective variable Y2 which is one of the display candidate objective variables and different from the objective variable Y1.

Another specific example will be described. For example, a case in which a graph displayed by the predetermined display destination is a three-dimensional graph may be conceived. In such a case, the explanatory variable of each graph displayed by the predetermined display destination is the explanatory variable X1 and an explanatory variable X2 which are two of the display candidate explanatory variables. The explanatory variable X1 and the explanatory variable X2 are variables different from each other. Then, the objective variable in one of the plurality of graphs displayed by the predetermined display destination is the objective variable Y1 which is one of the display candidate objective variables, and the objective variable in one of other graphs is the objective variable Y2 which is one of the display candidate objective variables and different from the objective variable Y1.

In this way, the display controller 101 executes display control processing. The display control processing is processing of controlling an operation of the predetermined display destination such as the display unit 10 to display a plurality of N-dimensional graphs, which are graphs of N dimensions (N is 2 or 3), on the predetermined display destination. Each of the N-dimensional graphs is a graph showing a relationship between Q−1 types (Q is an integer of 2 or more) of the explanatory variables among the display candidate explanatory variables and one type of the objective variable among the display candidate objective variables. Then, the N-dimensional graphs are each a graph showing a relationship between Q−1 types of the explanatory variables among the display candidate explanatory variables and one type of the objective variable among the display candidate objective variables.

Further, the displayed N-dimensional graph includes a first graph and a second graph in which the explanatory variables are common and the objective variables are different from each other. The explanatory variable common to both the first graph and the second graph is hereinafter referred to as a target explanatory variable. The explanatory variable of the first graph and the explanatory variable of the second graph are common. Therefore, the target explanatory variable is the explanatory variable of the first graph and is also the explanatory variable of the second graph. The target explanatory variable is, for example, the explanatory variable indicated by the image G109 of the slider shown in FIG. 2.

A specific example of the target explanatory variable is, for example, the explanatory variable X1 in the example of the two-dimensional graph described above. In this case, a specific example of the objective variable of the first graph is, for example, the objective variable Y1, and a specific example of the objective variable of the second graph is, for example, the objective variable Y2. A specific example of the target explanatory variable is, for example, the explanatory variables X1 and X2 in the example of the three-dimensional graph described above. In this case, a specific example of the objective variable of the first graph is, for example, the objective variable Y1, and a specific example of the objective variable of the second graph is, for example, the objective variable Y2.

Incidentally, the image displayed on the predetermined display destination is updated at least at a timing when a predetermined condition (hereinafter, referred to as a "first update condition") related to acquisition of designation information is satisfied. The designation information is information indicating Q−1 types among the display candidate explanatory variables. More specifically, the designation information is information for instructing the target explanatory variable.

The first update condition is, for example, a condition that the designation information has been input to the device (that is, the display device 1) itself by the user. The first update condition may also be, for example, a condition that the designation information has been input to the device itself via an external device. The first update condition may also be, for example, a condition that the display controller 101 has acquired the designation information.

An image when the first update condition is satisfied, specifically, the first graph and the second graph, is updated to a graph in which the display candidate explanatory variable indicated by the designation information is the target explanatory variable. In updating the graph, for each display candidate explanatory variable other than the target explanatory variable indicated by the designation information, a value of each display candidate explanatory variable immediately before the first update condition is satisfied is used.

Incidentally, since the target explanatory variable immediately before the first update condition is satisfied is displayed on the axis of the graph, it may not have been set to one value. However, the target explanatory variable immediately before the first update condition is satisfied is not the target explanatory variable after the first update condition is satisfied. Therefore, the target explanatory variable immediately before the first update condition is satisfied needs to have one value when the graph is updated. Therefore, for example, a predetermined value is used as a value of the target explanatory variable immediately before the first update condition is satisfied when the graph is updated. A value designated by the user may be used as the value of the target explanatory variable immediately before the first update condition is satisfied when the graph is updated.

Also, the image displayed on the predetermined display destination may also be updated at a timing when a predetermined condition (hereinafter, referred to as a "second update condition") regarding acquisition of fixed value change information is satisfied. The fixed value change information includes auxiliary explanatory variable information and information indicating a changed value of each explanatory variable designated by the auxiliary explanatory variable information.

The auxiliary explanatory variable is the display candidate explanatory variable other than the target explanatory variable. The auxiliary explanatory variable information is information that designates one or more auxiliary explanatory variables as objects to be changed in value. A change in display from FIG. 2 to FIG. 3 is a change due to the second update condition being satisfied. In the change in display from FIG. 2 to FIG. 3, the auxiliary explanatory variable indicated by the auxiliary explanatory variable information was the explanatory variable indicated by the image G107. Hereinafter, a value of the auxiliary explanatory variable will be referred to as a current variable value. The current variable value is a value of the display candidate explanatory variable and is used to generate the first graph and the second graph.

The second update condition is, for example, a condition that the fixed value change information has been input to the device (that is, the display device 1) itself by the user. The second update condition may also be, for example, a condition that the fixed value change information has been input to the device via an external device. The second update condition may also be, for example, a condition that the display controller 101 has acquired the fixed value change information.

When the second update condition is satisfied, the display controller 101 updates the graph according to the current variable value indicated by the fixed value change information. For example, the display controller 101 performs estimation using the current variable value indicated by the fixed value change information and a distribution estimation model to be described later. Then, the display controller 101 updates each graph displayed by the predetermined display destination to a graph estimated by the distribution estimation model.

Hereinafter, processing of updating, when the first update condition has been satisfied, the first graph and the second graph to be displayed on the predetermined display destination to a graph in which the display candidate explanatory variable indicated by the designation information is the target explanatory variable is referred to as first update processing. Also, processing of updating a display of the graph is hereinafter referred to as display graph update processing. Therefore, the display graph update processing includes the first update processing. The display graph update processing is executed by the display controller 101. Updating an image being displayed is displaying an image that is the same as or different from an image immediately before the update. Therefore, the display graph update processing is processing included in the display control processing.

The display graph update processing also includes a second update processing. The second update processing is processing of updating the first graph and the second graph to be displayed on the predetermined display destination to a graph after the change due to changing of the values of the explanatory variables indicated by the auxiliary explanatory variable information included in the fixed value change information to the current variable values indicated by the fixed value change information when the second update condition has been satisfied. That is, the second update processing is processing executed when the second update condition is satisfied, and is processing of updating them to a graph according to the current variable value indicated by the fixed value change information described above. The change from FIG. 2 to FIG. 3 is a result of the second update processing.

Further, as shown in FIGS. 2 and 3 as specific examples, the first graph or the second graph is a graph showing the representative value and the dispersion of the objective variable for each value of the target explanatory variable.

Also, at least a part of the representative value of the objective variables shown in the first graph or the second graph may be a value given in advance.

Also, the representative value and the dispersion of the objective variable shown in the first graph or the second graph may be values obtained using, for example, the distribution estimation model. The distribution estimation model is a mathematical model obtained in advance on the basis of a set of each value of the display candidate explanatory variables and each value of the display candidate objective variables and configured to estimate the representative value and the dispersion for each value of the display candidate explanatory variables. Therefore, the distribution estimation model is, for example, Gaussian process regression. The distribution estimation model may also be, for example, a learned mathematical model obtained by, for example, a method of machine learning using a set of each value of the display explanatory variable and each value of the display candidate objective variable as teacher data. A more detailed example of the method of machine learning will be described with a modified example.

Figure 4:
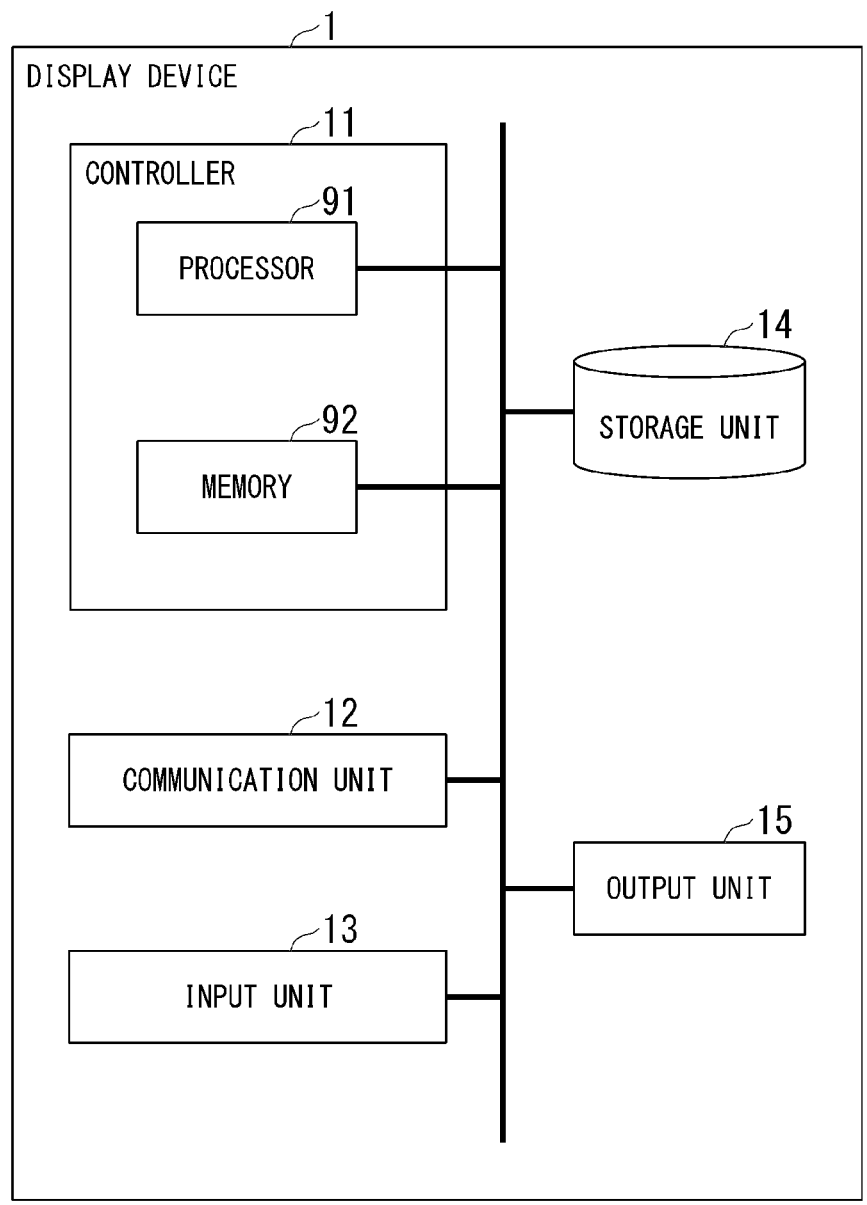
FIG. 4 is a diagram showing an example of a hardware configuration of the display device according to the embodiment.

FIG. 4 is a diagram showing an example of a hardware configuration of the display device 1 according to the embodiment. The display device 1 includes a controller 11 having a processor 91 such as a central processing unit (CPU) connected via a bus and a memory 92 to execute a program. The display device 1 functions as a device including the controller 11, a communication unit 12, an input unit 13, a storage unit 14, and an output unit 15 by executing the program.

More specifically, the display device 1 causes the processor 91 to read the program stored in the storage unit 14 and store the read program in the memory 92. When the processor 91 executes the program stored in the memory 92, the display device 1 functions as a device including the controller 11, the communication unit 12, the input unit 13, the storage unit 14, and the output unit 15.

The controller 11 controls operations of various functional units included in the display device 1. The controller 11 executes, for example, the display control processing.

The communication unit 12 is configured to include a communication interface for connecting the display device 1 to an external device. The communication unit 12 communicates with the external device via wire or wireless. The external device is, for example, a transmitter device of the designation information. The communication unit 12 acquires the designation information by, for example, communicating with the transmitter device of the designation information.

The input unit 13 is configured to include an input device such as, for example, a mouse, a keyboard, or a touch panel. The input unit 13 may also be configured as an interface that connects these input devices to the display device 1. The input unit 13 receives an input of information of various types to the display device 1. For example, the designation information is input to the input unit 13. For example, the fixed value change information is input to the input unit 13.

The input unit 13 may receive, for example, information (hereinafter, referred to as "objective variable designation information") designating types of the objective variable in each graph to be displayed on the display unit 10. When the objective variable designation information is input, the objective variable shown by each graph is changed to the objective variable designated by the objective variable designation information. Therefore, types of the objective variable of each graph displayed on the display unit 10 can be changed by the user. Further, the objective variable designation information may be input via the communication unit 12.

The storage unit 14 is configured using a computer-readable storage medium device such as a magnetic hard disk device or a semiconductor storage device. The storage unit 14 stores information of various types regarding the display device 1. The storage unit 14 stores information input via, for example, the communication unit 12 or the input unit 13.

When the fixed value change information is input, the storage unit 14 updates the stored current variable value to the current variable value indicating the fixed value change information. The storage unit 14 stores, for example, information of various types generated by execution of the processing by the controller 11. The storage unit 14 stores graphs obtained in advance by estimation using the distribution estimation model. When the first update condition or the second update condition is satisfied, a graph displayed by the display destination after being updated by the display graph update processing is a graph read from the storage unit 14. More specifically, the graph after being updated by the display graph update processing is a graph obtained by the estimation using the distribution estimation model and is a graph corresponding to the designation information and the stored current variable value among the graphs stored in the storage unit 14. The corresponding graph is a graph in which the explanatory variable indicated by the designation information is the target explanatory variable and is a graph in which a value of the explanatory variable other than the target explanatory variable among the display candidate explanatory variables is the current variable value.

The output unit 15 outputs information of various types. The output unit 15 is an example of a predetermined output destination. The output unit 15 is configured to include a display device such as, for example, a cathode ray tube (CRT) display, a liquid crystal display, or an organic electroluminescence (EL) display. The output unit 15 may also be configured as an interface that connects these display devices to the display device 1. The output unit 15 outputs, for example, information that has been input to the input unit 13. The output unit 15 may display, for example, a result of execution of the processing by the controller 11.

Further, the input unit 13 and the output unit 15 may be configured integrally as a touch panel. When it is configured as a touch panel, input of the designation information and the current variable value is performed by, for example, a touch operation on a screen. The touch operation may be, for example, an operation of moving the slider shown in FIG. 2, and the current variable value is changed by operating the slider. Also, the touch operation may be, for example, an operation of touching the slider indicating the explanatory variable in the diagram. The explanatory variable of the slider touched by the touch operation is set as the target explanatory variable.

Figure 5:
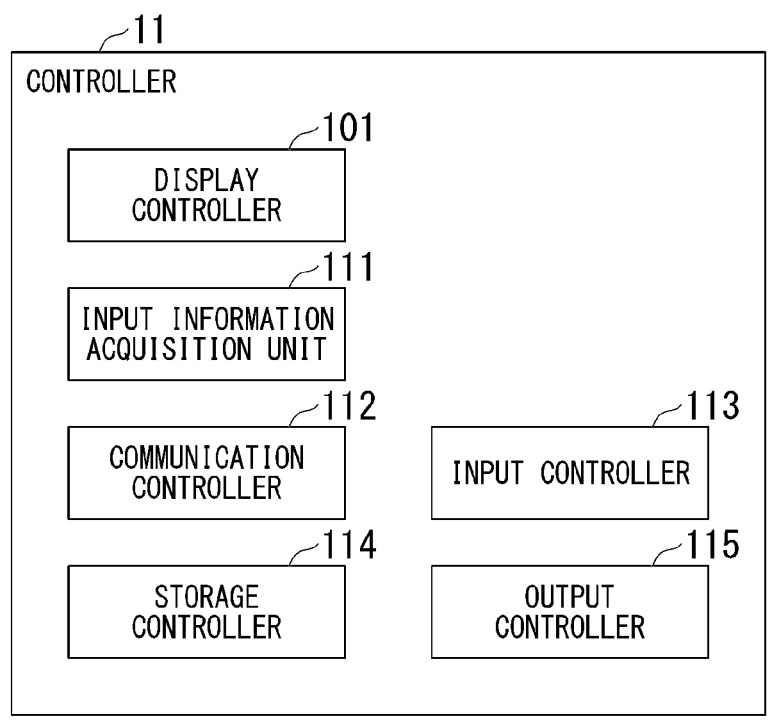
FIG. 5 is a diagram showing an example of a functional configuration of a controller in the embodiment.

FIG. 5 is a diagram showing an example of a functional configuration of the controller 11 in the embodiment. The controller 11 includes the display controller 101, an input information acquisition unit 111, a communication controller 112, an input controller 113, a storage controller 114, and an output controller 115.

The input information acquisition unit 111 acquires information of various types input to the communication unit 12 or the input unit 13. The input information acquisition unit 111 receives, for example, an input of the current variable value used to generate the first graph or the second graph.

The display controller 101 executes processing of various types described above. Therefore, the display controller 101 executes, for example, the display control processing.

Also, the display controller 101 may cause the display destination described above to display information indicating a range of obtainable values and information indicating the current variable value for each auxiliary explanatory variable. For example, the image of the slider and the image of the handle in FIGS. 2 and 3 are an example of the information indicating the range of obtainable values and the information indicating the current variable value which are displayed on the predetermined display destination. Therefore, for example, the display controller 101 may cause the predetermined display destination to display, for each auxiliary explanatory variable, the image of the slider indicating the range of obtainable values of the auxiliary explanatory variables, and the image of the handle which is an image of the handle displayed to be superimposed on the image of the slider and in which a position on the image of the slider being superimposed indicates the current variable value.

Also, for example, when the current variable value is input to the input information acquisition unit 111, the display controller 101 may control an operation of the predetermined display destination to update the above-described position at which the image of the handle is displayed to a position indicating a value that has been input to a current variable value acquisition unit. An example of this update is the change from the image G114 of the handle to the image G214 of the handle in the change from FIG. 2 to FIG. 3.

The communication controller 112 controls an operation of the communication unit 12. The input controller 113 controls an operation of the input unit 13. The storage controller 114 controls an operation of the storage unit 14. The output controller 115 controls an operation of the output unit 15.

Figure 6:
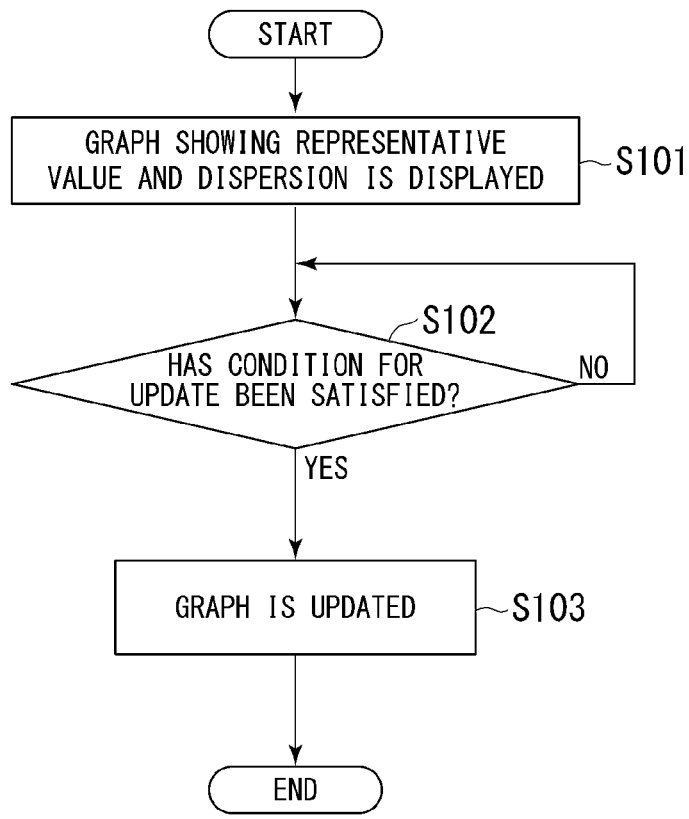
FIG. 6 is a flowchart showing an example of a flow of processing executed by the display device of the embodiment.

FIG. 6 is a flowchart showing an example of a flow of processing executed by the display device 1 of the embodiment. The display controller 101 displays at least the first graph and the second graph on the predetermined display destination (step S101). Next, the display controller 101 determines whether or not the second update condition is satisfied (step S102). If the second update condition is not satisfied (step S102: NO), the processing returns to step S102. On the other hand, if the second update condition is satisfied (step S102: YES), the second update processing is executed (step S103). When the second update processing is executed, the first graph and the second graph to be displayed on the predetermined display destination are updated to graphs after the change due to changing of the values of the explanatory variables indicated by the auxiliary explanatory variable information to the current variable values indicated by the fixed value change information.

The display device 1 of the embodiment configured as described above displays a graph showing the representative value and the dispersion of the objective variable for each value of the target explanatory variable. The representative value and the dispersion are intuitively easy to understand as shown in FIGS. 2 and 3. Therefore, the display device 1 can reduce effort required to obtain information from multidimensional data.

Also, the display device 1 of the embodiment configured as described above executes the display graph update processing. Therefore, the user can obtain a result after the target explanatory variable is changed without changing a program. Therefore, the display device 1 can reduce effort required to obtain information from multidimensional data.

Modified Example

As described above, the display device 1 has been described by taking a case in which a graph displaying the predetermined display destination is updated to a graph according to the designation information or the current variable value among the graphs stored in advance in the storage unit 14 when the first update condition or the second update condition is satisfied as an example. However, the graphs may not necessarily have to be stored in the storage unit 14 in advance. Each time the first update condition or the second update condition is satisfied, for example, the display controller 101 may perform estimation using the distribution estimation model that is executed as a part of the processing in step S103 and stored in the storage unit 14 to obtain the graph. Further, in such a case, the distribution estimation model may have been stored in the storage unit 14 in advance. Each time the first update condition or the second update condition is satisfied, for example, the distribution estimation model may be obtained in execution as a part of the processing of step S103.

The distribution estimation model obtained by the method of machine learning is, for example, a mathematical model expressed by a neural network including a plurality of estimators, and may be a mathematical model expressed by a neural network that outputs a distribution of estimation results of each estimator. Therefore, the method of machine learning may be, for example, a method using a plurality of weak learners such as ensemble learning. The ensemble learning may be, for example, bagging.

In a case of the distribution estimation model obtained by the ensemble learning, the representative value indicated by the graph showing a relationship between the explanatory variable and the objective variable such as the graphs shown in FIGS. 2 and 3 is, for example, a representative value in the distribution of the estimation results of each estimator. Also, in the case of the distribution estimation model obtained by the ensemble learning, the dispersion indicated by the graph showing a relationship between the explanatory variable and the objective variable such as the graphs shown in FIGS. 2 and 3 is, for example, dispersion in the distribution of the estimation results of each estimator. Each estimator included in the distribution estimation model obtained by the ensemble learning is each of the weak learners during execution of the ensemble learning. Therefore, the learned weak learner is the estimator.

Further, the graphs stored in the storage unit 14 can be changed according to an instruction of the user for changing a content of information. The change is a change made to the result obtained using the distribution estimation model according to an instruction of the user.

Further, the input unit 13 may receive an input of the current variable value used to generate the first graph or the second graph as described above and output the received current variable value to the input information acquisition unit 111. In such a case, a hardware configuration of the input unit 13 may be a hardware configuration that satisfies a condition of having a slider indicating a value of the objective variable associated in advance with a position of the handle and receiving an input of the current variable value due to an operation of the handle. Further, the handle in this case is a handle that can be grasped by the user.

Further, the input information acquisition unit 111 is an example of the current variable value acquisition unit. Further, the display controller 101 causes the predetermined display destination to display the representative value of the objective variable shown by the first graph or the second graph and values used for model construction. Further, the values used for the model construction are, for example, each value of the objective variables actually observed by an observation such as an experiment when the explanatory variable are each determined as one value. Further, each point of the "observed values" in the graphs G201 to G204 shown in FIG. 3 is an example of points indicating values used for such a model construction.

Further, the display device 1 may be mounted using a plurality of information processing devices that are communicably connected via a network. In this case, functional units included in each display device 1 may be implemented to be distributed in the plurality of information processing devices.

Further, all or part of functions of the display device 1 may be realized using hardware such as an application specific integrated circuit (ASIC), a programmable logic device (PLD), and a field programmable gate array (FPGA). The program may be recorded on a computer-readable recording medium. The computer-readable recording medium refers to, for example, a portable medium such as a flexible disk, a magneto-optical disk, a ROM, and a CD-ROM, and a storage device such as a hard disk built in a computer system. The program may be transmitted via a telecommunications line.

While the embodiment of the present invention has been described in detail above with reference to the drawings, the specific configurations are not limited to the embodiment and may include a design or the like within a range not departing from the gist of the present invention.

REFERENCE SIGNS LIST

1 Display device
11 Controller
12 Communication unit
13 Input unit
14 Storage unit
15 Output unit
101 Display controller
111 Input information acquisition unit
112 Communication controller
113 Input controller
114 Storage controller
115 Output controller
91 Processor
92 Memory

What is claimed is:

1. A display device comprising a display controller executing display control processing of controlling an operation of a predetermined display destination to cause the display destination to display a plurality of N-dimensional graphs, which are graphs of N dimensions (N is 2 or 3), wherein
when a plurality of types of predetermined explanatory variables are respectively defined as display candidate explanatory variables and a plurality of types of predetermined objective variables are respectively defined as display candidate objective variables, the N-dimensional graphs are each a graph showing a relationship between the explanatory variables of Q−1 types (Q is an integer of 2 or more) among the display candidate explanatory variables and the objective variable of one type among the display candidate objective variables,
the plurality of N-dimensional graphs comprise a first graph and a second graph in which the explanatory variables are common and the objective variables are different from each other,
when a predetermined condition related to acquisition of fixed value change information comprising auxiliary explanatory variable information designating one or more of auxiliary explanatory variables, which are the display candidate explanatory variables other than the common explanatory variables, as objects to be changed in value, and information indicating current variable values, which are values after the auxiliary explanatory variables are changed, is satisfied, the display control processing comprises processing of updating the first graph and the second graph to be displayed on the display destination to a changed graph due to changing of values of the auxiliary explanatory variables indicated by the auxiliary explanatory variable information to the current variable values indicated by the fixed value change information, and
the first graph or the second graph is a graph showing a representative value and a dispersion of the objective variable for each value of the common explanatory variables.

2. The display device according to claim 1, wherein, when a predetermined condition related to acquisition of designation information indicating Q−1 types among the display candidate explanatory variables is satisfied, the display control processing comprises processing of updating the first graph and the second graph to be displayed on the display destination to a graph in which the display candidate explanatory variables indicated by the designation information are the common explanatory variables.

3. The display device according to claim 1, wherein the display controller causes the display destination to display the representative value of the objective variable shown by the first graph or the second graph and values used for model construction.

4. The display device according to claim 1, wherein the representative value and the dispersion of the objective variable shown by the first graph or the second graph are values obtained using a mathematical model obtained in advance on the basis of a set of each value of the display candidate explanatory variables and each value of the display candidate objective variables and configured to estimate the representative value and the dispersion for each value of the display candidate explanatory variables.

5. The display device according to claim 4, wherein the mathematical model is a learned mathematical model obtained by a method of machine learning.

6. The display device according to claim 5, wherein the method of machine learning is ensemble learning.

7. The display device according to claim 6, wherein the representative value estimated by the mathematical model obtained by the ensemble learning is a representative value in a distribution of an estimation result of each learned weak learner, and the dispersion estimated by the mathematical model is dispersion in the distribution.

8. The display device according to claim 5, wherein the mathematical model is Gaussian process regression.

9. The display device according to claim 4, wherein the graph displayed by the display destination after being updated by the display control processing is a graph obtained by estimation by the display controller using the mathematical model each time the condition is satisfied.

10. The display device according to claim 1, further comprising a storage unit storing information indicating the graph, wherein
the graph displayed by the display destination after being updated by the display control processing is a graph read from the storage unit.

11. The display device according to claim 1, wherein the display controller causes the display destination to display information indicating a range of obtainable values and information indicating the current variable values for each of the auxiliary explanatory variables.

12. The display device according to claim 11, wherein the display controller causes the display destination to display, for each of the auxiliary explanatory variables, an image of a slider indicating a range of obtainable values of the auxiliary explanatory variables, and an image of a handle displayed to be superimposed on the image of the slider and in which a position on the image of the slider being superimposed indicates the current variable value used to generate the first graph or the second graph.

13. The display device according to claim 12, further comprising a current variable value acquisition unit receiving an input of the current variable value which is a changed value of the auxiliary explanatory variable which is the display candidate explanatory variable other than the common explanatory variable, wherein, when the value is input to the current variable value acquisition unit, the display controller controls an operation of the display destination to update the position at which the image of the handle is displayed to a position indicating a value that has been input to the current variable value acquisition unit.

14. The display device according to claim 13, further comprising an input unit receiving an input of the current variable value to output the received current variable value to the current variable value acquisition unit, wherein the input unit includes a slider indicating a value of the objective variable associated in advance with a position of the handle and receiving an input of the current variable value due to an operation of the handle.

15. A display method executed by a display device comprising a display controller executing display control processing of controlling an operation of a predetermined display destination to cause the display destination to display a plurality of N-dimensional graphs, which are graphs of N dimensions (N is 2 or 3), in which, when a plurality of types of predetermined explanatory variables are respectively defined as display candidate explanatory variables and a plurality of types of predetermined objective variables are respectively defined as display candidate objective variables, the N-dimensional graphs are each a graph showing a relationship between the explanatory variables of Q−1 types (Q is an integer of 2 or more) among the display candidate explanatory variables and the objective variable of one type among the display candidate objective variables, the plurality of N-dimensional graphs comprise a first graph and a second graph in which the explanatory variables are common and the objective variables are different from each other, when a predetermined condition related to acquisition of fixed value change information comprising auxiliary explanatory variable information designating one or more of auxiliary explanatory variables, which are the display candidate explanatory variables other than the common explanatory variables, as objects to be changed in value, and information indicating current variable values, which are values after the auxiliary explanatory variables are changed, is satisfied, the display control processing comprises processing of updating the first graph and the second graph to be displayed on the display destination to a changed graph due to changing of values of the auxiliary explanatory variables indicated by the auxiliary explanatory variable information to the current variable values indicated by the fixed value change information, and the first graph or the second graph is a graph showing a representative value and a dispersion of the objective variable for each value of the common explanatory variables, the display method comprising:

a display control step of controlling an operation of the predetermined display destination to cause the display destination to display the plurality of N-dimensional graphs, which are graphs of N dimensions (N is 2 or 3), wherein, when a predetermined condition related to acquisition of fixed value change information comprising auxiliary explanatory variable information designating one or more of auxiliary explanatory variables, which are the display candidate explanatory variables other than the common explanatory variables, as objects to be changed in value, and information indicating current variable values, which are values after the auxiliary explanatory variables are changed, is satisfied, the display control step comprises processing of updating the first graph and the second graph to be displayed on the display destination to a changed graph due to changing of values of the auxiliary explanatory variables indicated by the auxiliary explanatory variable information to the current variable values indicated by the fixed value change information.

\* \* \* \* \*